United States Patent [19]

Gotoh et al.

[11] Patent Number: 5,801,765
[45] Date of Patent: Sep. 1, 1998

[54] SCENE-CHANGE DETECTION METHOD THAT DISTINGUISHES BETWEEN GRADUAL AND SUDDEN SCENE CHANGES

[75] Inventors: Yukie Gotoh, Hirakatashi; Toshikazu Tatsumi, Higashiosakashi; Hiroshi Akahori, Hirakatashi, all of Japan

[73] Assignee: Matsushita Electric Industrial Co., Ltd., Japan

[21] Appl. No.: 739,995

[22] Filed: Oct. 30, 1996

[30] Foreign Application Priority Data

Nov. 1, 1995 [JP] Japan ................................. 7-284769

[51] Int. Cl.$^6$ .................................................. H04N 7/18
[52] U.S. Cl. .................................... 348/155; 348/700
[58] Field of Search ............................. 348/700, 701, 348/155, 154, 558, 576; H04N 7/137

[56] References Cited

U.S. PATENT DOCUMENTS

| | | | |
|---|---|---|---|
| 4,677,466 | 6/1987 | Lert, Jr. et al. | 348/4 |
| 5,455,561 | 10/1995 | Brown | 348/154 |
| 5,589,884 | 12/1996 | Ohguchi | 348/700 |
| 5,654,772 | 8/1997 | Mester et al. | 348/700 |

FOREIGN PATENT DOCUMENTS

| | | |
|---|---|---|
| 2-184181 | 7/1990 | Japan . |
| 3-214364 | 9/1991 | Japan . |
| 7-28840 | 10/1995 | Japan . |

OTHER PUBLICATIONS

"Automatic indexing method and object search method for color video picture", Johoshori Gakkai theses, vol. 33, No. 4, Apr., 1992.

*Primary Examiner*—Bryan Tung
*Attorney, Agent, or Firm*—Parkhurst & Wendel

[57] ABSTRACT

A video for one frame is captured and two adjacent frames are compared, the result of which is detected as a change degree of the video. Then, based on the magnitude of the change degree, it is determined whether a scene change (SC) exists. If an SC exists, it is examined whether its change degree alters rapidly or gradually, to determine the SC as a momentum or gradual SC. For the momentum SC, its determination point is detected as the momentum SC. For the gradual SC, its determination points is detected as the start of the gradual SC, thereafter, its end is detected. According, for one gradual SC, plural SC's are not detected and a midway illegible video is not indicated as an index picture.

4 Claims, 10 Drawing Sheets

SCENE-CHANGE DETECTION METHOD THAT DISTINGUISHES BETWEEN GRADUAL AND SUDDEN SCENE CHANGES

FILED OF THE INVENTION

The present invention relates to a method for detecting a location where a moving picture of scene greatly changes in a review and editing of moving pictures on a video tape and the like, and a moving picture editing apparatus which indicates an index of a moving picture based on a scene-change location.

BACKGROUND OF THE INVENTION

With the recent spread of video cameras and trend of multimedia, it has become more desirable for users to edit moving pictures recorded on a video tape or the like. For example, they make a digest of a video tape or link a necessary part of a video tape taken by themselves for its dubbing onto another video tape.

In such edits, it is necessary to grasp as to which picture exists in what place and, then do positioning of a tape in order to determine the range of a picture being recorded as a digest. Hence it takes much time with conventional simple functions such as forward, rewind and reproduce.

To solve above inconvenience, there has been proposed an apparatus which aims to simplify a review and browsing operation based on a break of a moving picture (hereinafter referred to as "scene-change"). For example, Japanese Patent Unexamined Publication No. 2-184181 discloses a moving picture editing apparatus in which the detection of a scene-change based on luminous intensity, volume and color tone of a moving picture allows to simplify operations of a reproduction up to the next scene-change, and a review and rewind toward another scene-change.

Japanese Patent Unexamined Publication No. 3-214364 discloses a method that automatically detects a scene-change from a video signal, in which the brightness level of histogram in a full screen is compared between adjacent frames and, when the sum of absolute values of the histogram differences exceeds a prescribed value, the presence of a scene-change is determined.

Another scene-change detecting method in which a screen is divided into plural blocks and a histogram comparison is performed for each block, not a full screen, has been proposed by Nagasaka and Tanaka,("Automatic indexing method and object search for color video picture", Johoshori Gakkai theses Vol. 33, No. 4 (1992)).

The method of the Publication No. 3-214364 will be briefly discussed.

FIG. 10 is a functional block diagram for explaining a prior art method. Referring to FIG. 10, a video signal input to a video signal input terminal 100 is sampled by a brightness determination means 101 at fixed intervals, and brightness information for one frame is captured therein. Brightness information for each pixel is quantized up to a prescribed level, and a brightness histogram for one frame is made by a histogram creation means 102. At this time, a switch means 103 employs two histogram storage means 104 which are replaced each frame processing. Thus the result of the histogram creation means 102 is stored either of the two histogram storage means 104, and the other 104 stores the previous frame histogram.

A histogram difference and absolute operation means 105 calculates the difference between two histograms for each section of brightness level to give its absolute value, by using the contents of the two histogram storage means 104, i.e., the histograms of the frame under processing and of the previous frame.

A histogram differential sum operation means 106 gives the sum of the difference absolute values being the results of the histogram difference and absolute value operation means 105.

A scene-change determination means 107 compares the above sum with a threshold value given by a threshold setting means 108, to determine that below the threshold value, there is no scene-change; and over the threshold value, a scene-change exists. The result is output from an output terminal 109, followed by the next frame processing.

The above prior art scene-change detecting method, however, has the following disadvantages.

Specifically, the scene-change is classified into two types depending on how a video changes: one in which a scene changes momentarily; and one in which a scene changes gradually. Those generally referred to as the scene-change is the former, i.e., a scene appeared in a moment of pressing a record start button (see FIG. 11(a)). The latter are those given special effects, such as effect and fade, when editing a video (see FIG. 11(b)). Hereinafter the former and the latter are referred to as "momentary scene-change" and "gradual scene-change" respectively.

In a gradual scene-change, it takes much time that a scene changes to another. In the FIG. 11(b), pictures H to K comprise a gradual scene-change. Therefore, these pictures should be detected as a cluster during a scene-change period.

The prior art scene-change detecting method, however, stipulates a "momentary" scene-change alone. That is, the sum of the histogram difference and absolute value between adjacent frames is calculated for each frame, and the determination whether or not a scene-change exists is also made for each frame. As a result, the pictures during a gradual scene-change period cannot be collected as a single scene-change.

When the prior art scene-change detecting method is utilized in a gradual scene-change, the following two problems will arise.

(i) Plural scene-changes may be detected from the duration of a gradual scene-change period. In the case as shown in FIG. 11(b), time points at which pictures I and K appear are detected as a scene-change. Therefore, when a header picture of a video tape is displayed using the result of a scene-change detection, some analogous pictures are displayed as the index.

(ii) As the index of a video tape, a picture immediately after a scene-change, i.e., a first picture of a scene, is often displayed as a header. In the prior art scene-change detecting method, however, "one moment" during a gradual scene-change is detected as a scene-change. As a result, a picture in the course of the gradual scene-change (e.g., the picture J in FIG. 11(b)) is displayed as the header. Such a picture is very illegible as the header picture because two different scenes are coexisting in one video.

As described above, in the prior art scene-change detecting method the detection of a scene-change is performed only by the unit of "moment", and therefore, it cannot react to a gradual scene-change whose detecting unit is "period."

SUMMARY OF THE INVENTION

It is an object of the present invention to provide a scene-change detecting method capable of reacting to a gradual scene-change.

It is another object of the present invention to provide a moving picture editing apparatus permitting a browsing which facilitates to grasp the contents of a picture.

Other objects and advantages of the present invention will become apparent from the detailed description given hereinafter; it should be understood, however, that the detailed description and specific embodiment are given by way of illustration only, since various changes and modifications within the scope of the invention will become apparent to the those skilled in the art from this detailed description.

According to a first aspect of the present invention, a scene-change detecting method includes a first step in which a comparison result between a frame picture of input video signals and another frame picture of input video signals, which frames are adjacent to each other, is detected as a video change degree and, if the video change degree is large, it is determined a scene-change exists; a second step in which when a scene-change is detected in the step 1, based on the continuity of the video change degree, it is determined whether the scene-change is a momentum or gradual scene-change; and a third step in which if the scene-change is determined as the momentum scene-change, its determined point is detected as the momentum scene-change, and if the scene-change is determined as the gradual scene-change, a period from its determined point to a point at which the video change degree is stable is detected as a gradual scene-change period.

According to a second aspect of the present invention, the scene-change detecting method as defined in the first aspect is characterized in that the first step determines the presence of a scene-change if the video change degree exceeds a prescribed threshold value, or if a time differential of the video change degree exceeds a prescribed threshold value.

According to a third aspect of the present invention, the scene-change detecting method as defined in the first aspect is characterized in that when the second step determines whether the determined scene-change is a momentum or gradual scene-change, provided that the video change degree at the point it is determined the scene-change exists is defined as a first change degree; and a video change degree for at least one frame captured after obtaining the first change degree is defined as a second change degree, if the second change degree is greatly smaller than the first change degree, the above scene-change is determined to be a momentum scene-change, if the difference between the first and second change degrees is small, the above scene-change is determined to be a gradual scene-change.

According to a fourth aspect of the present invention, a scene-change detecting method includes a picture capture means for capturing an input video signal into a frame memory; a video change degree detection means which compares the frame picture captured by the picture capture means with another captured prior to the above frame picture, to detect its comparison result as the video change degree; a video change degree storage means for storing the video change degree; a scene-change determination means which determines a scene-change exists if the input video change degree exceeds a prescribed threshold value; a momentum and gradual scene-change determination means in which when the scene-change determination means determines a scene-change exists the video change degree is input and, based on the continuity of the change degree, it is determined whether the above scene-change is a momentum or gradual scene-change and, for a gradual scene-change, its determination point is detected as the start of the gradual scene-change; a gradual scene-change end detection means in which when the momentum and gradual scene-change determination means determines the above scene-change is a gradual scene-change, the above video change degrees of the subsequent frame picture captured by the picture capture means is successively input and, the point at which the above video change degree holds constant is detected as the end of the gradual scene-change period; an index information storage means which stores an index picture of a moving picture and its information; and an index picture recording means in which if the momentum and gradual scene-change determination means detects the above momentum scene-change and also the gradual scene-change end detection means detects the end of the above gradual scene-change period, a video signal is input as an index picture and then stored in the index information storage means, at the same time, a time counter corresponding the above video signal is recorded as associated information of the above index picture, in the index information storage means.

DETAILED DESCRIPTION OF THE PREFERRED EMBODIMENT

[Embodiment 1]

In a scene-change detecting method according to a first embodiment of the present invention, for a momentum scene-change, the moment that one scene changed to another scene is detected as a scene-change, and for a gradual scene-change, a duration that one scene is changing to another scene is detected as a scene-change.

Figure 2:
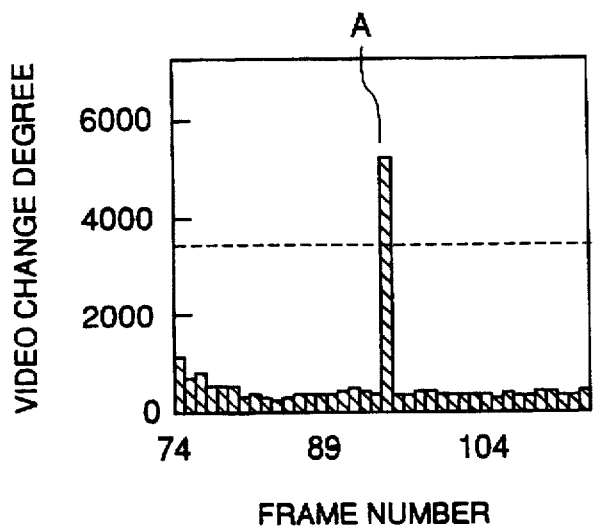
FIG. 2(a) is a graph illustrating a video change degree having a momentum scene-change.
FIG. 2(b) is a graph illustrating a video change degree having a gradual scene-change.
Figure 2:
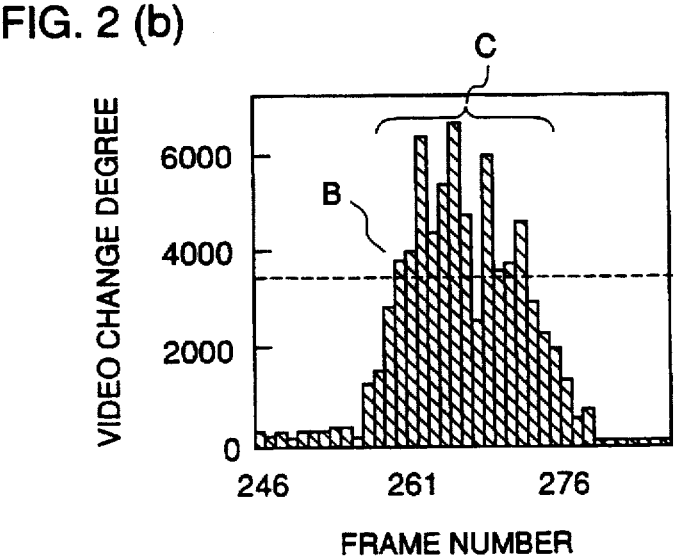

Referring to FIGS. 2(a) and 2(b), the principle of this detecting method will be described. FIGS. 2(a) and 2(b) show the time variation of a video change degree in a momentum scene-change and a gradual scene-change, respectively. Here, the video change degree is defined as the result of "comparison between videos of adjacent frames," which is "an evaluation value that increases with the video change degree increase." This corresponds to the sum of absolute values of histogram differences in the prior art, but is not limited thereto. Examples thereof include difference value between frames, and results of histogram comparison between blocks subjected to screen split.

As shown in FIG. 2(a), in a momentum scene-change the moment a scene changes (i.e., the time A) alone has a high video change degree, exhibiting a rapid change compared with peripheral change degrees. Whereas in a gradual scene-change as shown in FIG. 2(b), high values are retained in a scene-change period (i.e., the period C).

Utilizing this feature, when a high change degree is detected, it is determined whether the subsequent change degree drops rapidly or retains a certain value or more, that is, the continuity of the change degrees is determined, thereby determining a momentum or gradual scene-change.

In FIG. 2(a) the time A is the first to be detected as a high change degree, which time is detected as a momentum scene-change. In FIG. 2(b) the time B where a high change degree appears first is specified as the start of a gradual scene-change.

In a gradual scene-change, it is also necessary to specify its end. The gradual scene-change period shown in FIG. 2(b) is in the course of changes between two scenes, so that the change degree is held at high value. But after the scene-change, the video is stable so that the change degree is held at low value. Therefore, the point at which the presence of the gradual scene-change is detected is determined as its start point, and the point at which a low change degree begins is determined as its end.

Figure 1:
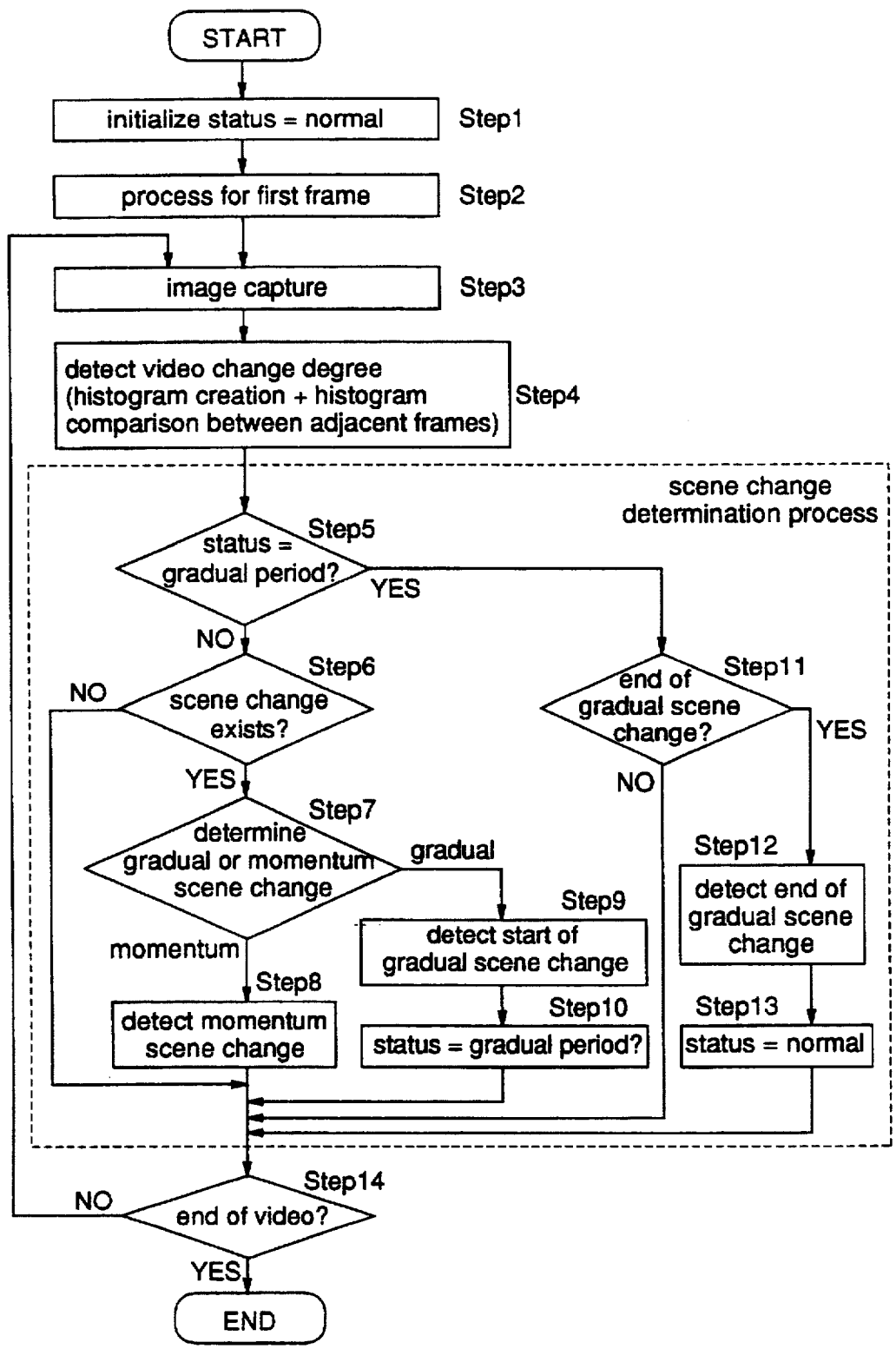
FIG. 1 is a flow chart illustrating a flow of scene-change detecting operation of a scene-change detecting method according to a first embodiment of the present invention.

Referring now to FIG. 1, the flow of a scene-change detecting operation of the scene-change detecting method will be described. FIG. 1 is a flow chart illustrating the scene-change operation of the scene-change detecting method according to the first embodiment of the present invention.

Figure 10:
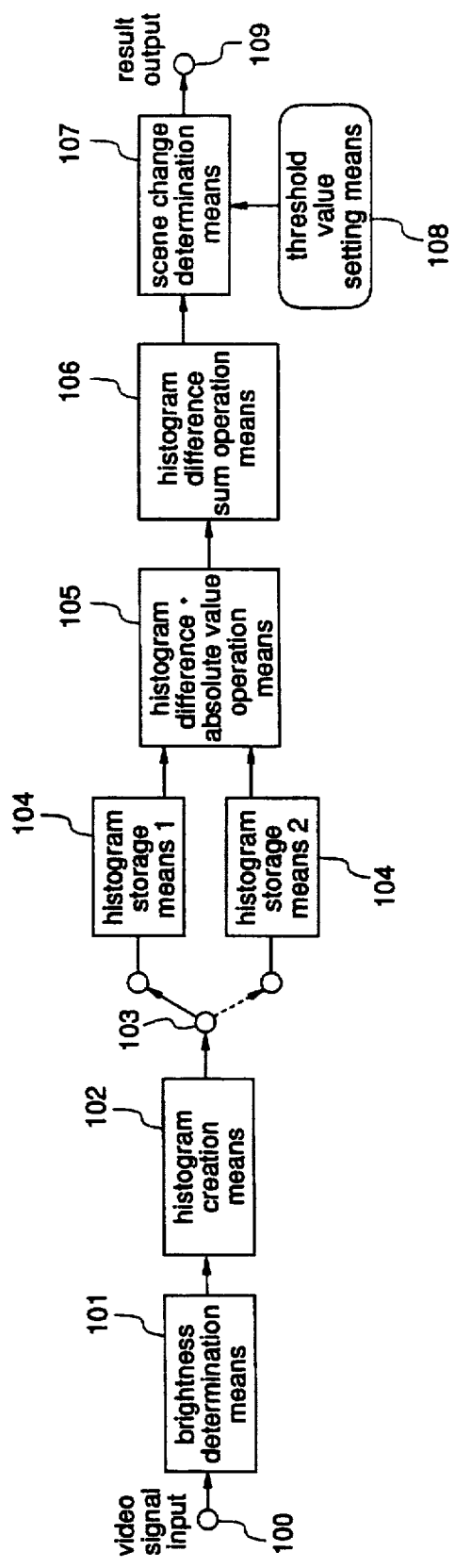
FIG. 10 is a functional block diagram for explaining a prior art scene-change detecting method.
Figure 11:
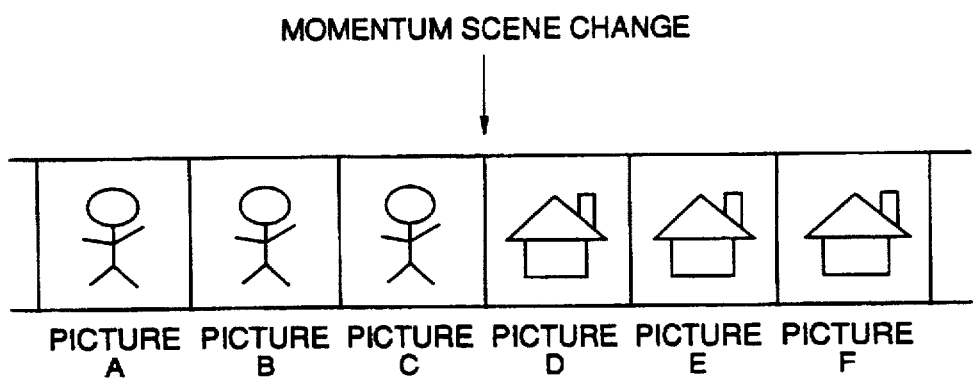
FIGS. 11(a) and 11(b) are diagrams illustrating a momentum scene-change and a gradual scene-change respectively.
Figure 11:
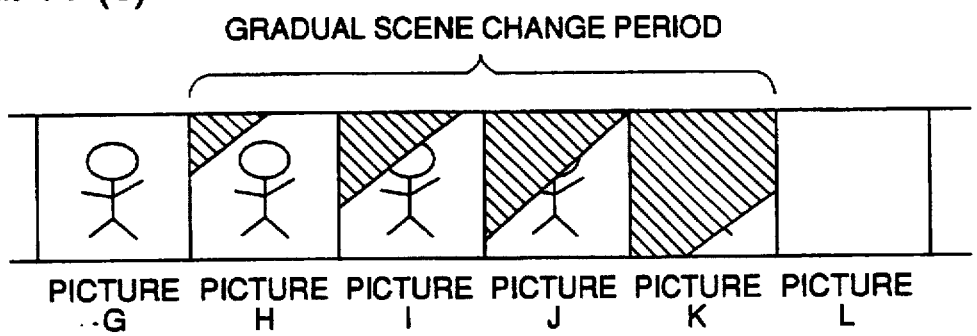

An initialization process (Step 1) and a process for a first captured frame (Step 2) are performed one time before repeated processes, including a picture capture (Step 3), a video change degree detection (Step 4) and a scene-change determination (Step 5 through Step 13). The Steps 3 and 4 are the same as those of the prior art. That is, in the block diagram of FIG. 10 related to the aforesaid publication No. 3-214364, Step 3 corresponds to the process performed by the brightness determination means 101, and Step 4 corresponds to the processes performed from the histogram creation means 102 through a histogram difference sum operation means 106.

A description is now given of the details of each Step in the scene-change detection operation.

In Step 1, the loop number of the repeated processes and the state variable value for determining a scene-change are set as the initial value. In Step 2, an input video is captured into a frame memory, and a brightness histogram for the first captured frame is created.

The Step 3 and the subsequent Steps are repeated until a video to be processed is terminated.

Figure 3:
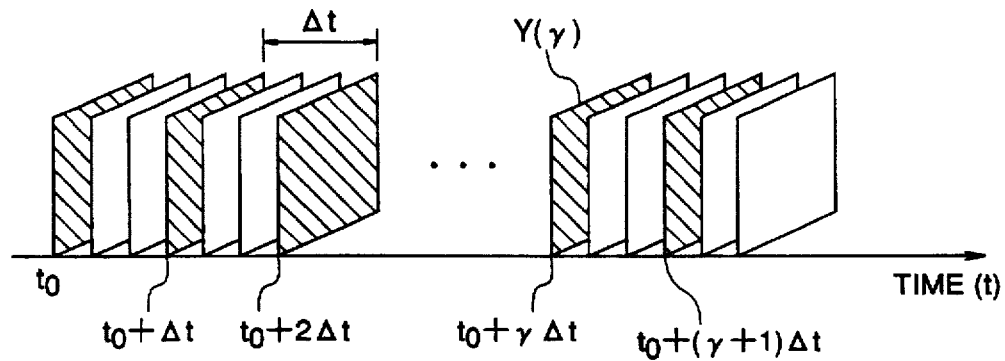
FIG. 3 is a diagram illustrating the relationship between frames and pictures to be captured.

Specifically, in Step 3, a video signal is captured into a frame memory. Suppose that total time from Step 3 through Step 12 is defined as $\Delta t$, a frame is to be captured every $\Delta t$. With reference to FIG. 3, squares aligned in the direction of time lapse designate 30 frames per second, and also illustrates a frame into which a colored frame is captured. This figure represents one capture for three frames, i.e., $\alpha t=0.1$ sec. Hereinafter the brightness information of a frame (for one screen) captured in the time $(t0+\tau\Delta t)$ is referred to as $Y(\tau)$ for simplicity.

In Step 4, brightness histogram is compared between adjacent frames, and its result is detected as a video change degree.

Specifically, a brightness histogram his($\tau$,c) for the captured frame brightness information $Y(\tau)$ is created, provided that picture brightness level has been quantized into c_max gradations, and his($\tau$,c) indicates the sum of pictures having cth brightness level in one screen.

Then, the histogram thus obtained is compared with that in the previous processing and the difference between the two histograms is determined for each brightness level, to give the respective absolute values. The result of the cth brightness level is expressed by the following equation:

$$|hist(\tau, c) - hist(\tau-1, c)| \qquad (1)$$

Figure 4:
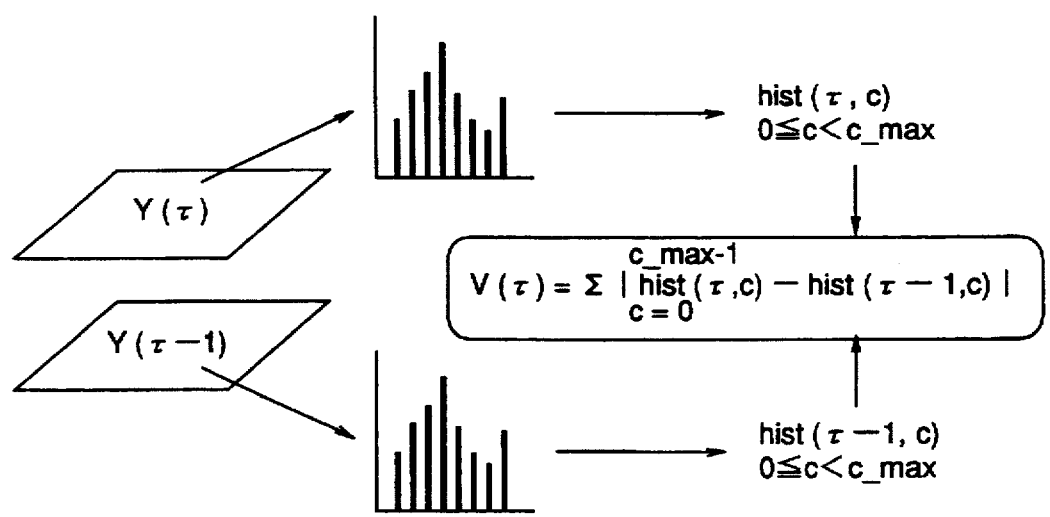
FIG. 4 is a diagram explaining a method of detecting a video change degree, using histogram difference.

(see FIG. 4).

Finally the sum of the absolute values of the differences, as expressed by the following equation (2), is determined in each brightness level, which is then output as a video change degree $V(\tau)$.

$$V(\tau) = \sum_{c=0}^{c\_max-1} |hist(\tau,c) - hist(\tau-1,c)| \qquad (2)$$

A description is now given of Step 5 and the subsequent a Steps being improved in the present invention. In these Steps, it is determined whether a scene-change exists and, if a scene-change exists, which scene-change is then determined whether a momentum or gradual one. For a gradual one, its period is specified.

The Steps 5 to 13 will be described in detail. Assuming that a frame being processed is one captured at the time $(t0+\tau\Delta t)$, and processes described below are performed immediately after a video change degree $V(\tau)$ is detected.

In Step 5, it is determined whether a video being processed is in a gradual scene-change period. Assuming that the status of the above video is stored in a variable status. Hereinafter two statuses of the gradual scene-change period and non-gradual scene-change period are referred to as "gradual period status" and "normal status" respectively.

According to the result of Step 5, the subsequent Step is decided. That is, for the normal status, the operation proceeds to Step 6 in which the presence or the absence of a scene-change is determined. For the gradual period status, it proceeds to Step 11 in which the end of the gradual scene-change period is detected.

A description will be given of the subsequent processes when determined to be "normal status" in Step 5, i.e., the processes for determining whether a scene-change exists or not.

(I) When the result of Step 5 is "normal status"

In Step 6, if the video change degree $V(\tau-1)$ exceeds a threshold value, i.e., if the following equation (3) is satisfied, it is determined that a scene-change exists in the vicinity of the time $(t0+\tau\Delta t)$. If not, it is determined that normal scenes continue.

$$V(\tau-1) > TH1 \qquad (3)$$

If no scene-change exists, the operation proceeds to Step 14 to examine whether any video to be processed remains or not. If a scene-change exists, it proceeds to Step 7.

In Step 7, it is determined whether the scene-change detected in Step 6 is a momentum or gradual scene-change. Specifically, if the following equation (4) is satisfied, the scene-change is determined to be a gradual one. If not, it is determined to be a momentum one.

$$V(\tau) > V(\tau-1) \cdot GAIN \qquad (4)$$

When determined to be a momentum scene-change, the operation proceeds to Step 8 to output the result that the time (t0+τΔt) is a momentum scene-change. Then, the operation proceeds to Step 14 to examine whether any video to be processed remains or not.

In a case where an index picture is recorded using a moving picture editing apparatus, by recording the video at this point, the first picture of a scene is taken as the index.

On the other hand, when determined to be a gradual scene-change in Step 7, the operation proceeds to Step 9 to output the result that the time (t0+τΔt) is the start of the gradual scene-change. And in Step 10, the status is updated to "gradual period status." The operation then proceeds to the process for detecting the end of the gradual scene-change period, and finally to Step 14 to examine whether any video to be processed remains or not.

A description will be given of the subsequent processes if determined to be "gradual period status", i.e., those for detecting the end of the gradual scene-change period.

(II) When the result of Step 5 is "gradual period status"

In Step 11, it is determined whether a video being processed is in a gradual scene-change period, or is the end of a gradual scene-change period. Specifically, if one of the following equations is satisfied, the above video is determined to be in a gradual scene-change period. If none of the equations is satisfied, it is determined to be the end of the gradual scene-change period.

$$V(\tau) > TH3 \qquad (5)$$

$$V(\tau-1) > TH4 \qquad (6)$$

$$V(\tau) > V(\tau-1) \qquad (7)$$

When determined to be in a gradual scene-change period, the status retains as it is, and the operation proceeds to Step 14.

When determined to be the end of the gradual scene-change period, the operation proceeds to Step 12 to output the result that the time (t0+τ22 t) is the end of the gradual scene-change period. Then in Step 13, the status is updated to "normal status", and the operation proceeds to Step 14. Thus, the subsequent processes are performed for detecting a new scene-change.

In a case where an index picture is recorded using a moving picture editing apparatus, by recording the video at this point, a legible video can be recorded as the index because the above video appears after the gradual scene-change, i.e., after a scene-changes.

The above flow of the operations is performed for the status being in a gradual scene-change period.

After the scene-change determination processes of Steps 5 through 13, in Step 14 it is examined whether any video to be processed remains or not. When such a video remains, the operation is returned to Step 3 in order to repeat the same processes.

Accordingly, the scene-change detecting method of the embodiment 1 utilizes the continuity of a video change degree, as well as the scene-change determination. This enables to distinguish between the momentum and gradual scene-changes.

In the prior art, a scene-change is determined by comparison of histograms of one block and another. In the first embodiment of the present invention, momentum and gradual scene-changes are determined based on the continuity of the final evaluation in each frame. If determined a momentum scene-change, its determined "moment" is detected as a scene-change. If determined a gradual scene-change, the "moment" a picture fluctuates is detected as a scene-change. This prevents one moment in a scene-change period from being detected as a scene-change, permitting the reactions to both momentum and gradual scene-changes.

In the scene-change determination, the presence of a scene-change is detected if a video change degree or the time difference of the video change degree exceeds a prescribed threshold value. Therefore it is possible to perform the scene-change determination based on whether or not the change degree or the time difference exceeds the threshold value.

Further, the determination as to whether the scene-change thus detected is a momentum or gradual scene-change is based on the following manner. Assuming that a video change degree at the point where the scene-change is determined is defined as a first change degree, and a video change degree for at least one frame picture captured after the above frame picture is defined as a second change degree. Then, when the second change degree turns to be greatly smaller than the first change degree, the above scene-change is determined to be a momentum one, and when the difference between the first and second change degrees is small, it is determined to be a momentum one. Thus it is possible to determine whether the detected scene-change is a momentum or gradual scene-change.

With respect to the detected gradual scene-change, there is detected the point at which low video change degree begins, in order to specify the end of the gradual scene-change period. Therefore, it is possible to solve the prior art problems that the moment a scene changes in a gradual scene-change period is detected as the scene-change, and that plural scene-changes are detected in a gradual scene-change period.

Accordingly, the embodiment 1 enables to react to the gradual scene-change, as well as the momentum scene-change which has been reacted with the prior art method. This facilitates the index picture indication browsing and edit operation based on the scene-change.

Although the embodiment 1 utilizes the sum of absolute values of the histogram difference between one frame and another as the "video change degree", that may be replaced with the evaluation value utilized in the prior art method.

Brief description will be given of a method in which histogram is compared for each block subjected to screen split, as another configuration of the video change degree.

A video is captured into a frame memory, and the captured frame Y(τ) is divided into 16 (4×4) blocks. With the assumption that the blocks are numbered, the color histogram of the rth block of the frame Y(τ) is indicated as hist(τ,r, c). With the assumption that the color of a picture is quantized into 64 colors, the hist(τ,r,c) indicates the number of pixels having cth color in the block.

Then, there is compared the color histograms of the two respective blocks of the frames Y(τ) and Y(τ×1), which blocks are in the same position in each frame. Here, $\chi^2$ sanction is employed as the method of comparing the above histograms. The evaluation value kai(τ,r) for the rth block of the frame Y(τ) is determined according to the following equation:

$$kai(\tau,r) = \sum_{c=0}^{63} \frac{\{hist(\tau,r,c) - hist(\tau-1,r,c)\}^2}{hist(\tau,r,c)} \qquad (8)$$

Evaluation values for 16 blocks are determined, and the sum of eight evaluation values in increasing order in the 16 values are determined, to define a video change degree V(τ). The method of defining the V(τ) is expressed, for simplicity, by the following equation:

$$V(\tau) = Sum_r \text{ of } Min(kai(\tau, r)) \qquad (9)$$

As previously above, the method of comparing histograms between blocks subjected to screen split may be used instead of the histogram for full screen. The $\chi^2$ sanction may be used instead of the sum of absolute values of histogram differences. In addition, color components may be used instead of brightness. With the difference picture between two frame, there is obtained the number of pixels exhibiting a great change, which number may be employed as the video change degree.

A description will be given of a moving picture editing apparatus utilizing the above scene-change detecting method.

The moving picture editing apparatus of the first embodiment detects a scene-change from video signals of a moving picture, and records and indicates a video in the vicinity of the first of each scene as an index picture. The first video of a scene is one which appears immediately after a momentum scene-change or after the end of a gradual scene-change period. Thus in both the momentum and gradual scene-changes, a legible video as the index picture can be recorded.

Referring to a functional block diagram of FIG. 5, a description will be given of the structure of the above moving picture editing apparatus, including a video input terminal 1 that inputs a video signal from a video tape, an optical disk or the like; a picture capture means 2, a histogram creation means 3; a switch means 4 that switches the output of the means 3; histogram storage means 5, 6; a video change degree detection means 7; a video change degree storage means 8; switch means 9 that switches the process depending on the contents of a status storage means 14; a scene-change determination means 10; a switch means 11 that switches the process depending on the output of the means 10; momentum and gradual scene-changes determination means 12; a switch means 13 that switches the process depending on the output of the means 12; a status storage means 14 that stores the status of a video under processing; an index picture record means 15; a gradual scene-change end detection means 16; an output terminal 18 that outputs the result of the scene-change detection; a time counter input terminal 19 that inputs the time counter of a video under processing; and an index information storage means 20 that stores the information of a recorded index picture. White arrows showing inputs to the switch means 9,11,13 indicate the flows of information referred to in determining the subsequent process.

Figure 5:
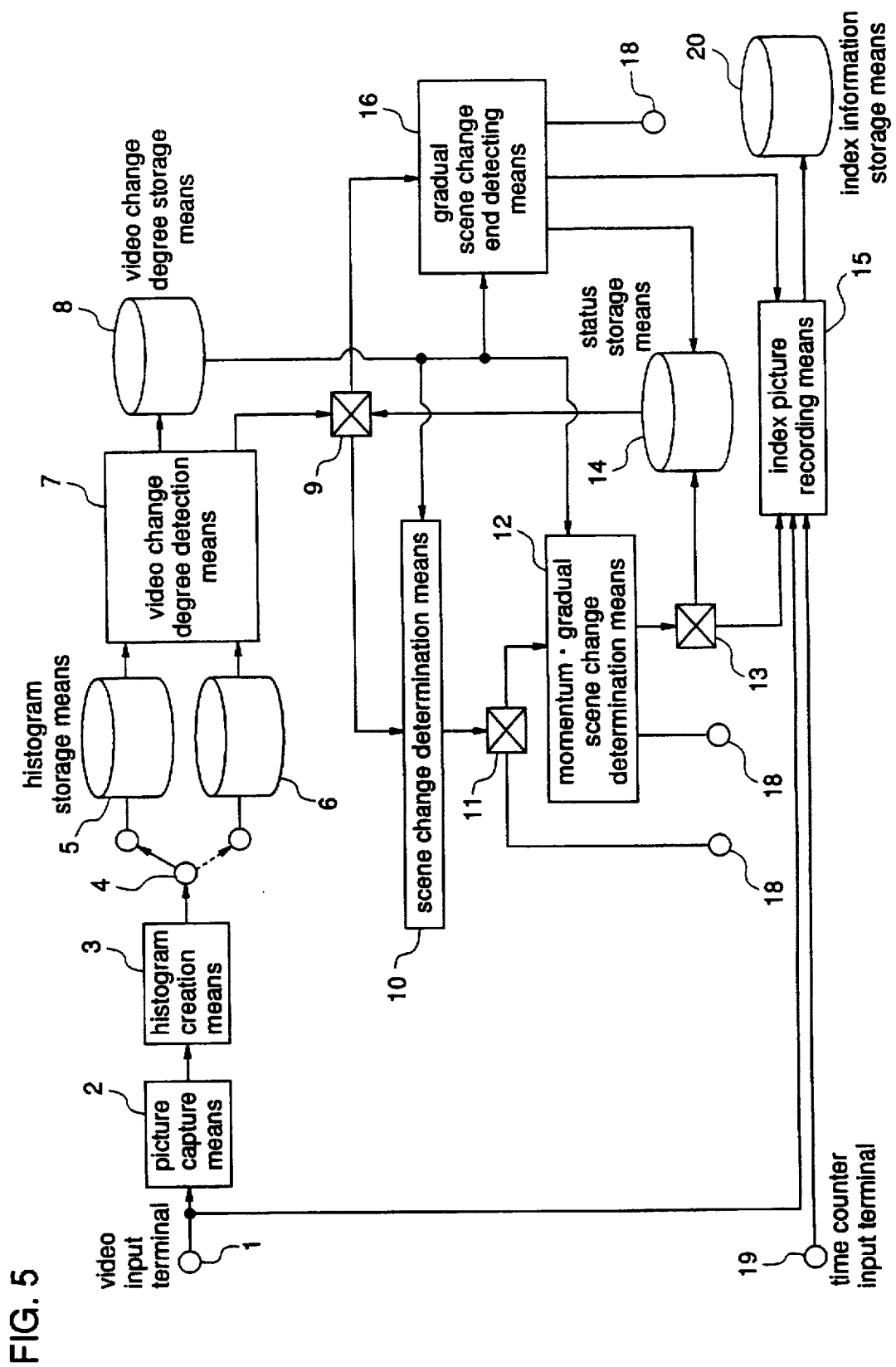
FIG. 5 is a functional block diagram illustrating a moving picture editing apparatus to which a scene-change detecting method is applied.

Referring now to FIG. 5, the operation of the moving picture editing apparatus in the embodiment 1 will be briefly described.

A video signal input to the video input terminal 1 is sampled by the picture capture means 2 at a certain interval, and the brightness information for one frame is captured therein. The brightness information for each pixel is quantized into a prescribed level, and the brightness histogram for one frame is created by the histogram creation means 3. At this stage, the switch means 4 switches two histogram storage means 5, 6 for every processing, so that the result of the histogram creation means 3 is stored either of the two histogram storage means. Thus the other stores the histogram of the previous frame.

In the change degree detection means 7, with the contents of the histogram storage means 5 and 6, i.e., the histogram of the frame under processing and that of the previous frame, difference between the two histograms is determined for every section obtain brightness level, to obtain each absolute value. Further, the sum of the difference absolute value in each section is determined and its result is detected as "video change degree." The detected change degree is successively stored in the video change degree storage means 8.

The above processes are those which correspond to Steps 3 and 4 shown in FIG. 1.

A description will be given of processes corresponding to the scene-change determination, i.e., Steps 5 through 13. Here, the input video is classified into five types: a video in which a normal scene continues; a video appeared immediately after a momentum scene-change; a video appeared at the start of a gradual scene-change period; one in a gradual scene-change period; and a video appeared at the end of a gradual scene-change.

(A) A video in which normal scenes continue

The switch means 9 corresponds to Step 5 in FIG. 1, and switches the subsequent process according to the status stored in the status storage means 14. Specifically, for "normal status", the means 9 switches the process to the scene-change determination means 10. For "gradual period status", it switches the process to the gradual scene-change end determination means 16.

As for this type, since the video under processing normal scenes continue, the status is set to "normal status", and the process is switched to the scene-change determination means 10.

The process of the scene-change determination means 10 corresponds to Step 6 in FIG. 1. Specifically, a video change degree is input from the video change degree storage means 8 and, if the video change degree $V(\tau-1)$ exceeds the threshold value TH1, the means 10 determines a scene-change exists in the vicinity of the time($t0+\tau\Delta t$). Below the TH1, the means 10 determines normal scenes continue.

As for this type, it is determined that normal scene continue. Then, the result "normal scenes continue" is output to the output terminal 18 via the switch means 11, where the means 11 switches the process depending on the result of the means 10.

The above operations are performed in the scene-change determination in cases where normal video is being input.

After the means 10 outputs the result to the output terminal 18, the picture capture means 2 captures a new video, and the aforementioned processes are repeated.

(B) A video appeared immediately after a momentum scene-change

The status in the switch means 9, is set to "normal status", the process is switched to the scene-change determination means 10. If the video change degree exceeds the threshold value TH1, the means 10 determines a scene-change exists. The reason for this is that the video change degree immediately after a momentum scene-change increased rapidly, exhibiting high value.

The process is then switched, via the switch means 11, to the momentum and gradual scene-changes determination means 12. The means 12 corresponds to Step 7 in FIG. 1, and determines whether the scene-change detected by the means 10 is a momentum or gradual scene-change. Specifically, the video change degree is input to the means 12 from the means 8, if the change degree alters rapidly, the scene-change is determined to be a momentum one, and if a similar change degree continues, it is determined to be a gradual scene-change.

As for this type, since the video immediately after a momentum scene-change is being input, the change degree alters rapidly, resulting in a momentum scene-change. The result is output to the output terminal 18. Further, via the switch means 13, the process of the index record means 15 is performed. In the means 13, a video for one frame is input from the input terminal 1, and the video is then stored in the index information storage means 20, as an index picture. At this time, a time counter corresponding to the index picture is input to the means 15 from the time counter input terminal 19, and the time counter is then recorded so as to correspond to the index picture, in the means 20.

The above operations is performed in the scene-change determination in cases where the video immediately after a momentum scene-change is being input.

After the result is output to the output terminal 18, in the picture capture 2, a new video is input and the same processes are repeated.

(C) A video appeared at the start of a gradual scene-change

The processes of the switch means 9, the scene-change determination means 10 and the switch means 11 are the same as in the case of the above type (B). Therefore, their descriptions are omitted.

After the processing of the switch means 11, the momentum and gradual scene-changes determination means 12 determines whether an input video is a momentum or gradual scene-change.

As for this type, since the video in the vicinity of the start of a gradual scene-change is input, the change degree keeps high value, resulting in a gradual scene-change. The result "start of gradual scene-change" is output to the output terminal 18 and, via the switch means 13, the status of the status storage means 14 is updated from "normal status" to "gradual period status". Thus, the subsequent process are for detecting the end of the gradual scene-change.

The above operation is performed in the scene-change determination in cases where a video in the vicinity of the start of a gradual scene-change is being input.

After the result is output to the output terminal 18, the picture capture means 2 captures a new video and the same processes are repeated.

(D) A video in a gradual scene-change period

This type video appears after detecting the start of a graduate scene-change. The status stored in the status storage means 14 has been updated to "gradual period status". Therefore, the switch means 9 switches the process to the gradual scene-change end detection means 16.

The means 16 corresponds to Step 11 in FIG. 1. That is, according to the change degree of the video input from the video change degree storage means 8, it is determined to be "gradual scene-change period" if the change degree satisfies one of the equations (5),(6),(7), and "gradual scene-change period ends" if none of the above equations is satisfied.

This type video is in a gradual scene period and its change degree keeps high value. Thus, one of the equations (5),(6),(7) is satisfied, resulting in "gradual scene-change period". The result is then output to the output terminal The above operation is performed in the scene-change determination in cases where a video in a gradual scene-change period is being input.

After the result is output to the output terminal 18, the picture capture means 2 captures a new video, and the same processes are repeated.

(E) A video at the end of a gradual scene-change

The switch means 9 switches the process to the gradual scene-change end detection means 16, as in the case of the type (D).

Since this type video locates in the vicinity of the end of a gradual scene-change, its change degree keeps low value. Therefore, in the means 16 none of the above equations (5),(6),(7) is satisfied, resulting in "the end of gradual scene-change". The result is then output to the output terminal 18. The status of the status storage means 14 is updated from "gradual period status" to "normal status." Thus, the subsequent process is performed for detecting a new scene-change mode. Thereafter, the processing is switched to the index picture record means 15.

In the means 15, a video for one frame is input from the input terminal 1, and the video is then stored in the index information storage means 20, as an index picture. At this time, a time counter corresponding to the index picture is input to the means 15 from the time counter input terminal 19, and the time counter is then recorded so as to correspond to the index picture, in the means 20.

The above operation is performed in the scene-change determination in cases where a video in the vicinity of the end of a gradual scene-change is being input.

After the result is output to the output terminal 18, the picture capture means 2 captures a new video, and the same processes are repeated.

As described above, in the moving picture editing apparatus recording and indicating the index pictures of the aforementioned moving pictures, utilizing the scene-change detection method in which momentum and gradual scene-changes are detected and a video immediately after the momentum scene-change and a video at the end of the gradual scene-change are recorded as an index picture, it is possible to solve the problems that a video under changing in a gradual scene-change is recorded as the index, and that plural indexes are recorded from one gradual scene-change. This leads to a legible index picture, facilitating easy grasp of a moving picture.

[Embodiment 2]

A scene-change detecting method according to the embodiment 2 of the present invention will be described.

In the embodiment 1, prior to the determination of the momentum or gradual scene-change, the scene-change determination process, i.e., Step 6 in FIG. 1, is performed and then the presence or the absence of a scene-change is determined using the above equation (1). However, the momentum scene-change and the gradual scene-change originally differ from each other in the time variation of the change degree. In some cases, therefore, the presence and the absence of the scene-change cannot be determined by a single equation.

Among the prior art scene-change detecting methods, there is one in which a scene-change is detected based on the time difference of the comparison between adjacent frames.

Specifically, in the difference pictures between two frames, i.e., a moving picture whose absolute value of difference between frames is indicated by brightness, the area $S(\tau)$ of a pixel having a great change is detected as the result of the comparison between the frames. Time differential for the area $S(\tau)$ is determined and, if both equations:

$$S(\tau)-S(\tau-1)>TH5 \qquad (10)$$

$$S(\tau+1)-S(\tau)<-TH5 \qquad (11)$$

where TH5 is a threshold value, are satisfied at the same time, it is determined a scene-change exists.

This method utilizes the feature that in a momentum scene-change the comparison result between frames is rapidly changed before and. after the momentum scene-change (see FIG. 2(a)). On the other hand, for a video which is not a scene-change but has a relatively high change degree (e.g., a video having sharp move), when the scene-change determination is made depending on the magnitude of the video change degree, such a video tends to be erroneously determined as a scene-change (see the change degree of the video shown in FIG. 6). But the variation of the change degree is gentle, resulting in small time differential. Therefore, by utilizing the time differential, the difference between a momentum scene-change and other videos including no scene-change can be clearly distinguished, permitting more precise scene-change determination.

Figure 6:
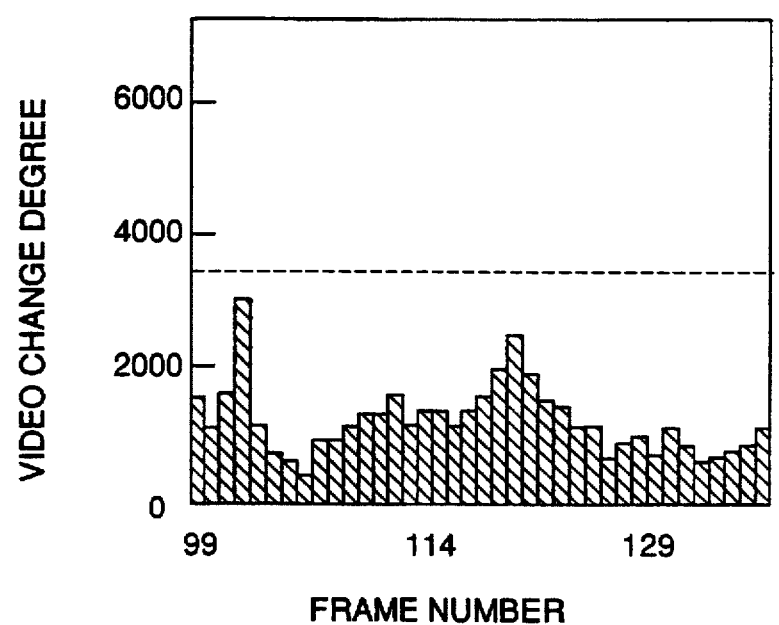
FIG. 6 is a graph illustrating a change degree of a video including no scene-change.

However, compared the video change degree of the gradual scene-change as shown in FIG. 2(b) with that of the video including no scene-change as shown in FIG. 6, irrespective of the difference of the value, their variations of the change degree are both gentle, resulting in small time differential. Therefore, with time differential, a gradual scene-change cannot be detected.

On the basis of the above discussion, in the embodiment 2 that permits the correct distinction of a momentum scene-change from a video not being scene-change, and also the correct detection of a gradual scene-change, the scene-change determination is performed using two discriminants for a momentum scene-change and a gradual scene-change.

A description will be given of the scene-change detecting process of the embodiment 2, which process corresponds to Step 6 in FIG. 1.

The discriminant for momentum scene-change utilizes the time differential of a video change degree. That is, if the discriminant (12) is satisfied, scene-change exists.

$$V(\tau-1)-V(\tau-2)>TH6 \tag{12}$$

The discriminant for gradual scene-change utilizes the magnitude of a video change degree, which is utilized in the embodiment 1. That is, if the discriminant (13) is satisfied, a scene-change exists.

$$V(\tau-1)>TH7 \tag{13}$$

As stated above, the discriminant (12) or (13) is satisfied, the presence of a scene-change is determined.

When a scene-change exists, which is then determined whether the momentum or gradual scene-change in Step 7 shown in FIG. 1, followed by the same processes as in the case of the embodiment 1.

The effect of the scene-change determination process of the embodiment 2 will be illustrated.

Figure 7:
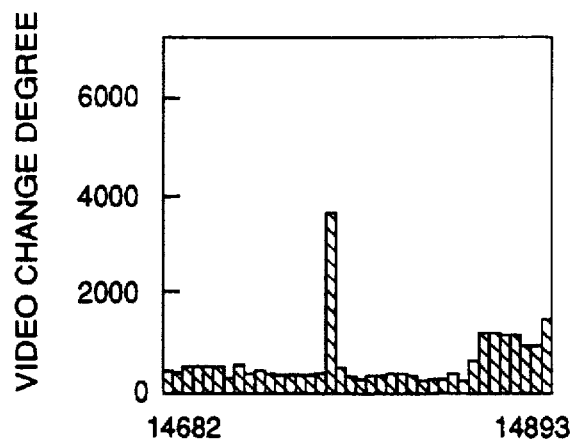
FIGS. 7(a) to 7(c) are graphs illustrating video change degrees of a momentum scene-change, a video including no scene-change, and a gradual scene-change, respectively.
Figure 7:
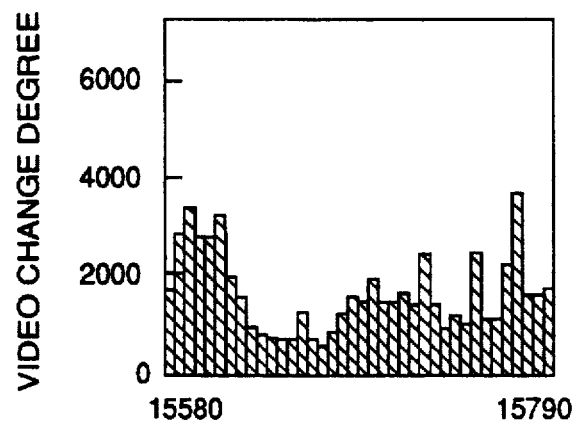
Figure 7:
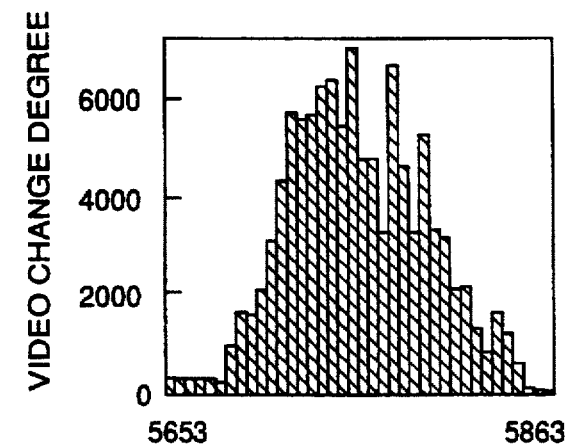

FIGS. 7(a) to 7(c) illustrate the time variation of the change degree as to a video in the vicinity of a momentum scene-change, a video including no scene-change, and a video in the vicinity of a gradual scene-change, respectively.

Firstly discussed is the case where the videos as shown in FIGS. 7(a) to 7(c) are determined by the scene-change determination method using the magnitude of the change degree, i.e., the equation (3) in the embodiment 1. The magnitude of the change degree of the momentum scene-change in FIG. 7(a) is about the same as the maximum change degree of the video including no scene-change in FIG. 7(b). Thus, by the scene-change determination method of the embodiment 1, the momentum scene-change of FIG. 7(a) cannot be detected, or from the video in FIG. 7(b) a video not the scene change is erroneously detected as a scene-change.

Figure 8:
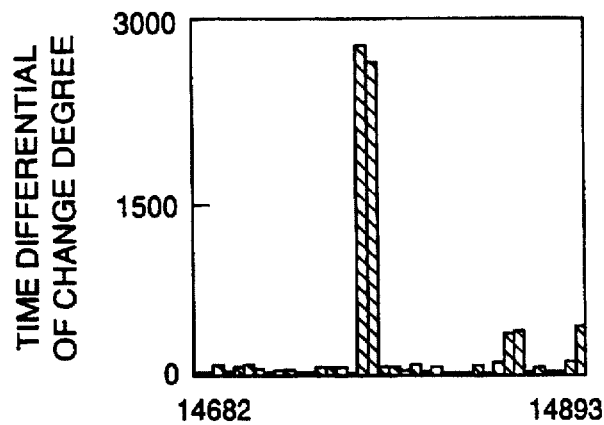
FIGS. 8(a) to 8(c) are graphs illustrating time differentials of the change degrees of a momentum scene-change, a video including no scene-change, and a gradual scene-change, respectively.
Figure 8:
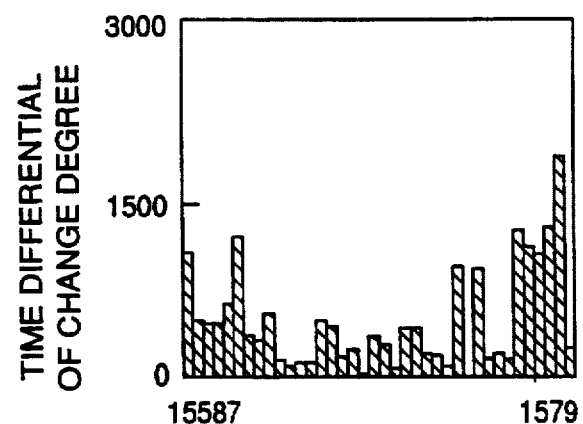
Figure 8:
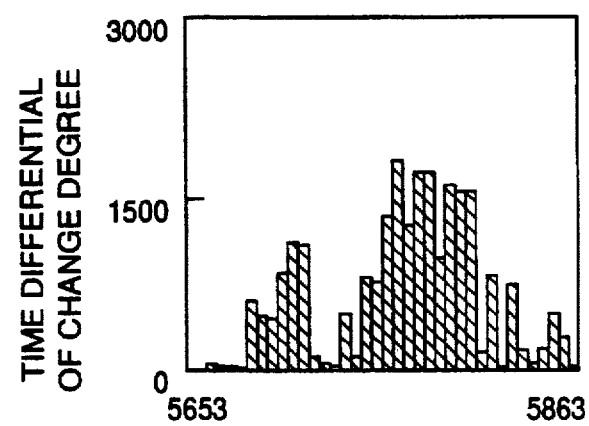

Secondly discussed is the case where the aforementioned videos are determined by the time differential of the video change degree as in the prior art. FIGS. 8(a) to 8(c) each illustrating the absolute value of the time differential, |V(τ)−V(τ−1)|. FIGS. 8(a) to 8(c) correspond to the videos of FIGS. 7(a) to 7(c) respectively. It should be noted that in FIG. 8(a) only the change degree at the scene-change becomes great, and therefore, the time differential at the scene-change, and that between before and after the scene-change become great. As can be seen from these figures, the differential of the video change degree of the momentum scene-change in FIG. 8(a) is higher than that of the video including no scene-change in FIG. 8(b), so that it is easy to distinguish between the momentum scene-change and the video including no scene-change. However, the differential of the video change degree of the gradual scene-change in FIG. 8(c) is also about the same as that of the video in FIG. 8(b). Therefore, it is impossible to accurately distinguish the video in FIG. 8(b) from the video of FIG. 8(c), only by the time differential of the change degree.

Finally discussed is the case where the aforementioned videos are determined by the scene-change determination method of the embodiment 2 is utilized.

In the discriminant (12) for the momentum scene-change (hereinafter referred to as first discriminant), the threshold value TH6 is set to "a value smaller than the differential of the change degree of the momentum scene-change and also greater than the maximum differential of the change degree of the video including no scene-change."

For example, in FIGS. 8(a) to 8(c), the threshold value TH6 may be set to about 2,000. As a result, the video of FIG. 8(a) satisfied the first discriminant only at the scene-change, those of FIGS. 8(b) and 8(c) do not satisfy the first equation.

In the discriminant (13) for the gradual scene-change (hereinafter referred to as second discriminant), the threshold value TH7 is set to a value smaller than the video change degree in the vicinity of the start of the gradual scene-change and also greater than the maximum video change degree of the video including no scene-change.

For example, in FIGS. 7(a) to 7(c), the threshold value TH7 may be set to about 4,000. As a result, the videos of moment scene-change in FIGS. 7(a) and the videos of expect on scene-change in 7(b) do not satisfy the second discriminant, but the gradual scene-change period in FIG. 7(c) satisfies the second discriminant.

Thus in the embodiment 2, the presence of a scene-change is determined at the point where at least one of the first and the second discriminants is satisfied. Therefore, by setting the threshold value as described in the cases of FIGS. 7(a) to 7(c) and FIGS. 8(a) to 8(c), the momentum scene-changes shown in FIGS. 7(a) and 8(a), and the gradual scene-changes in FIGS. 7(c) and 8(c) can be precisely detected. As a result, it is preventable that in the videos of expect on scene-change in FIGS. 7(b) and 8(b), a video not being scene-change is erroneously detected as the scene-change.

As described above, in the scene-change detecting method of the embodiment 2, when determining a video under processing is a scene-change or not, there are utilized the video change degree and the discriminant that jointly uses the differential of the video change degree, for the momentum scene-change and for the gradual scene-change. This increases the accuracies for detecting both the momentum and gradual scene-changes, and also reduces incorrectness that a video including no scene-change is erroneously determined as a scene-change.

[Embodiment 3]

A scene-change detecting method according to the embodiment 3 will be described.

In the scene-change detecting method of the embodiment 3, after the presence of a scene-change is recognized, it is determined whether the scene-change is the momentum or gradual scene-change, which corresponds to Step 7 shown in FIG. 1. In the embodiment 1, if the video change degree V(τ−1) of the video determined as having a scene-change and the change degree V(τ) of the next captured video satisfy the discriminant (14), it is determined to be the gradual scene-change and, if not, the momentum scene-change.

$$V(\tau)>V(\tau-1)\cdot GAIN \tag{14}$$

The above determination utilizes the feature that in the momentum scene-change the video change degree alters rapidly at before and after the scene-change, whereas in the gradual scene-change the video alters gently, so that the change degree also alters gently. The above GAIN may be set to about 0.5.

Figure 9:
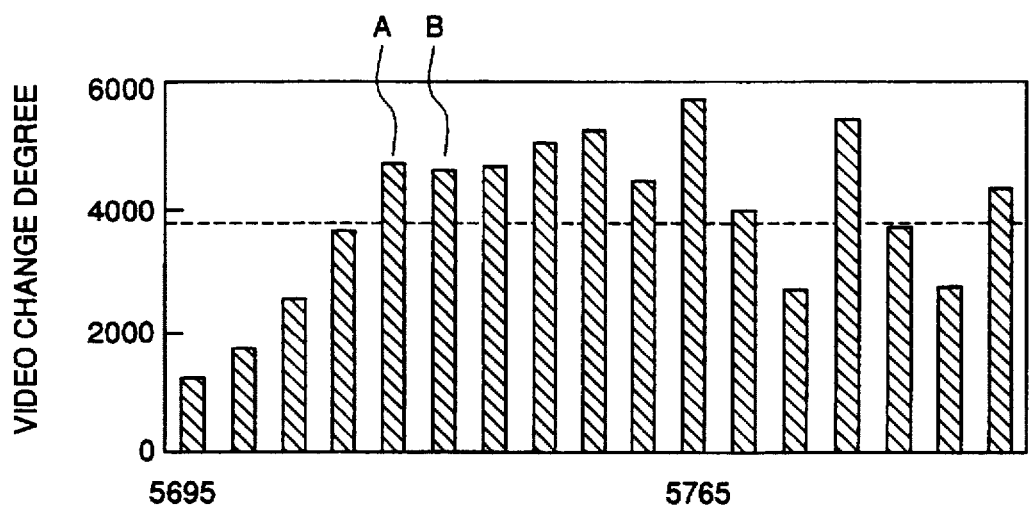
FIGS. 9(a) and 9(b) are graphs illustrating a video change degree in the vicinity of a gradual scene-change.
Figure 9:
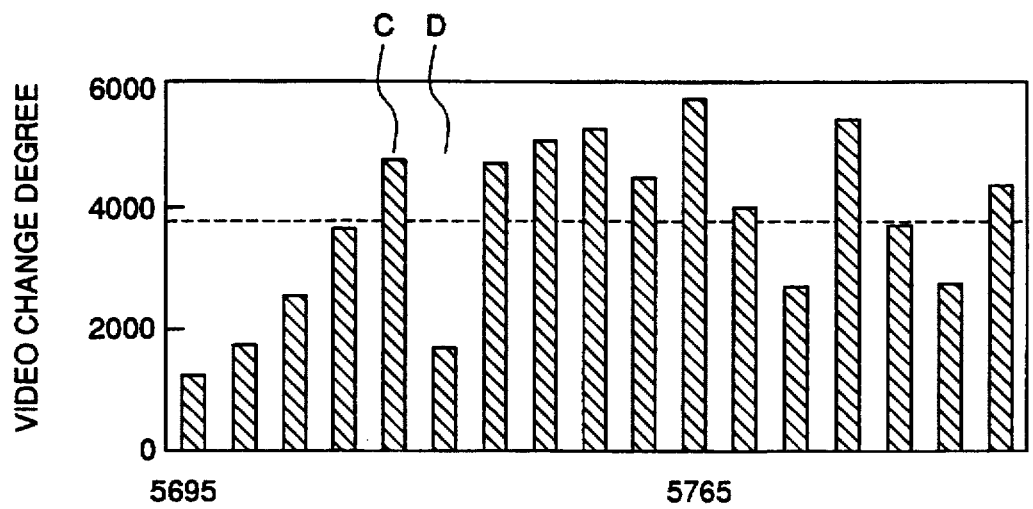

Referring now to FIGS. 9(a) and 9(b), FIG. 9(a) illustrates the video change degree in the vicinity of a gradual scene-change, wherein the time A at which a scene-change is detected in Step 6 in FIG. 1, designates the video change degree at that time. That is, the V(τ) and the V(τ−1) correspond to the change degrees of the times B and A, respectively. Since the both change degrees are almost the same, the above scene-change is easily determined to be the gradual scene-change by the discriminant (14).

FIG. 9(b) illustrates another gradual scene-change, wherein the V(τ) and the V(τ−1) correspond to the change degrees of the times D and C, respectively. As can be seen this figure, sometimes the V(τ) is fairly smaller than the V(τ−1). This is caused by an unexpected scattering occurred at the time D, because the change degrees after the time D are about the same.

Thus in the embodiment 3, in order that the momentum and gradual scene-change determination is unaffected by noise, not one point of the V(τ) but plural points change degrees are collectively evaluated.

A description will be given of the momentum and gradual scene-change determination method according to the third embodiment.

Firstly the scene-change determination is performed in Step 6 shown in FIG. 1. That is, if satisfied the discriminant (15), a scene-change exists.

$$V(\tau-N) > TH8 \quad (15)$$

In Step 7, if satisfied the discriminant (16), the scene-change recognized in Step 6 is determined to be the gradual scene-change and, if not, it is the momentum scene-change.

$$V(\tau-N) \cdot GAIN < \left\{ \sum_{i=0}^{N-1} V(\tau-i) \right\} / N \quad (16)$$

As described above, in the scene-change detecting method of the embodiment 3, plural video change degrees are collected to detect the continuity of the video change degree, leading to stable results of the momentum and gradual scene-change determination.

Although in the above discriminant the mean of the plural change degrees is employed, the middle value of the plural change degrees may be employed.

What is claimed is:

1. A scene-change detecting method including:
   a first step in which a comparison result between a frame picture of input video signals and another frame picture of input video signals, the frames being adjacent to each other, is detected as a video change degree and, if the video change degree is great, it is determined a scene-change exists, wherein the first step determines that there is a scene-chance when a time differential of the video change degree exceeds a prescribed threshold value;
   a second step that distinguishes the scene-change determined in the first step between a momentum scene-change and a gradual scene-change, based on a continuity of the video change degree; and
   a third step in which for the momentum scene-change determined in the second step, its determined point is detected as the momentum scene-change, and for the gradual scene-change determined in the second step, a period from its determined point to a point at which the video change degree is stable, is detected as a gradual scene-change period.

2. A scene-change detecting method according to claim 1, wherein the first step determines the presence of a scene-change if the video change degree exceeds a prescribed threshold value.

3. A scene-change detecting method according to claim 1, wherein when the second step distinguishes the determined scene-change between a momentum scene-change and a gradual scene-change, provided that a video change degree at a point where the scene-change exists is defined as a first change degree, and a video change degree for at least one frame picture being captured after the first change degree is defined as a second change degree and, if the second change degree is greatly smaller than the first change degree, the above scene-change is determined to be the momentum scene-change, if the difference between the first and second change degrees is small, the above scene-change is determined to be the gradual scene-change.

4. A scene-change detecting apparatus including:
   a picture capture means for capturing an input video signal into a frame memory;
   a change degree detection means that compares a frame picture captured by the picture capture means with another frame picture captured previously, to detect its comparison result as a video change degree;
   a video change degree storage means for storing the video change degree;
   a scene-change determination means that determines a scene-change exists if the change degree of the input video exceeds a prescribed threshold value;
   a momentum and gradual scene-change determination means that distinguishes the scene-change determined in the scene-change determination means between a momentum scene-change and a gradual scene-change, utilizing the video change degree and a continuity thereof; the momentum and gradual scene-change determination means detecting a momentum scene-change determination point as the momentum scene-change, and detecting a gradual scene-change determination point as a start point of the gradual scene-change;
   a gradual scene-change end detection means in which if the momentum and gradual scene-change determination means determines the above scene-change as the gradual scene-change, a video change degree in a subsequent frame picture captured by the picture capture means is successively input and, a point at which the video change degree holds constant is detected as an end of the gradual scene-change duration;
   an index information storage means for storing an index picture of a moving picture and information thereof; and
   an index information recording means in which if the momentum and gradual scene-change determination means detects the above momentum scene-change and the gradual scene-change end detection means detects the end of the above gradual scene-change duration, a video signal is input as an index picture, which is then stored in the index information storage means, at the same time, a time counter corresponding the above video signal is recorded as associated information of the index picture, in the index information recording means.

* * * * *